March 29, 1932.　　　H. F. SMITH　　　1,851,458
REFRIGERATING APPARATUS
Filed March 27, 1930　　2 Sheets-Sheet 1
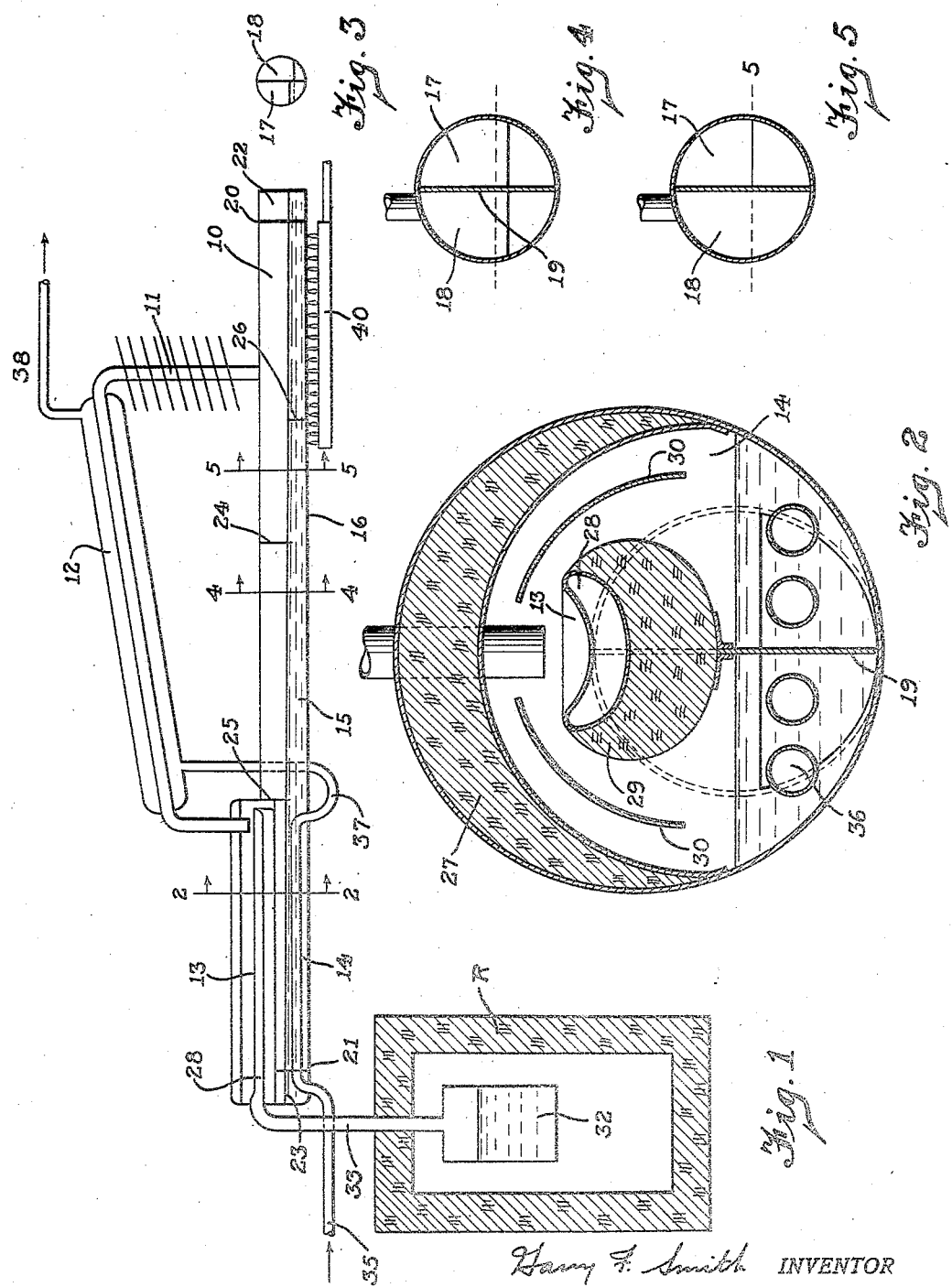

March 29, 1932.  H. F. SMITH  1,851,458
REFRIGERATING APPARATUS
Filed March 27, 1930     2 Sheets-Sheet 2
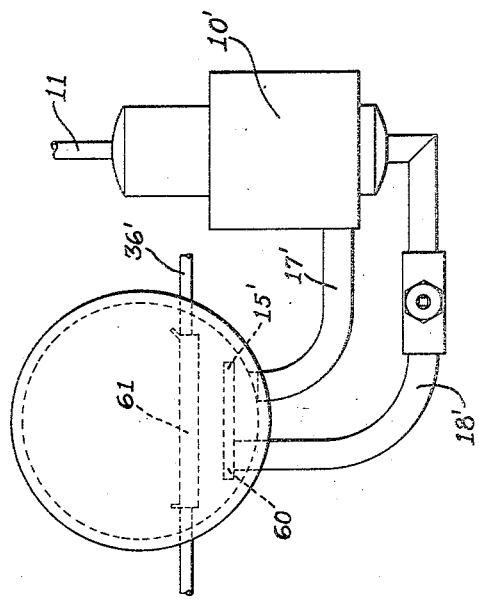
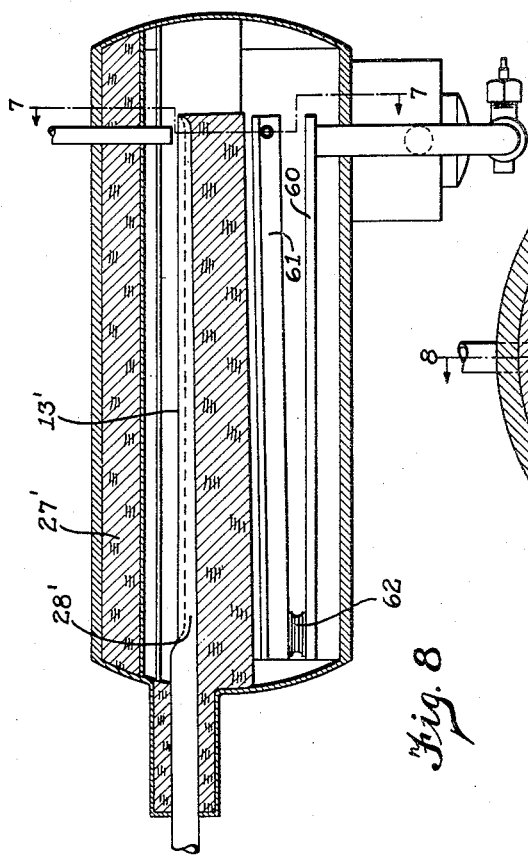
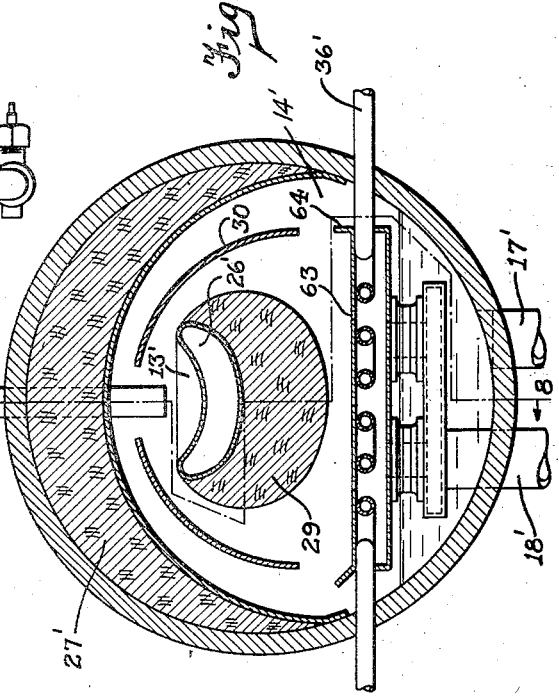
Harry F. Smith INVENTOR
BY
Spencer, Hardman & Fehr ATTORNEYS Patented Mar. 29, 1932

1,851,458

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 27, 1930. Serial No. 439,379.

This invention relates to refrigerating apparatus and more particularly to refrigerating apparatus of the absorption type.

For one of its objects, this invention contemplates an improved apparatus of the equal pressure type providing an improved circulation of inert gas between the evaporator and absorber.

For another one of its objects, this invention contemplates an improved absorption refrigerating apparatus, and more particularly, an absorption refrigeration apparatus wherein the evaporator is located within the absorber, and wherein means are provided for preventing the transfer of heat from the absorber to the evaporator. It is also an object of this invention to provide means in thermal contact with said evaporator for supplying the latent heat to the refrigerant evaporating within said evaporator.

A further object of this invention is to provide an improved absorption refrigerating apparatus of the constant pressure type, wherein the evaporator is positioned within and in open communication with the absorber in an atmosphere of inert gas, and wherein means are provided for preventing the flow of heat from the absorber to the evaporator.

Further objects and advantages of the present invention will be apparent from the following description, reference being had to the accompanying drawings, wherein a preferred form of the present invention is clearly shown.

In the drawings:

Fig. 1 is a diagrammatic section of a refrigerating machine embodying features of this invention;

Fig. 2 is a vertical section on the line 2—2 of Fig. 1;

Fig. 3 is a side plan view of the generator end of the apparatus;

Figs. 4 and 5 are vertical sectional views taken on the line 4—4 and 5—5 of Fig. 1;

Fig. 6 is a view in elevation of a modified form of apparatus embodying this invention;

Fig. 7 is a vertical section through the absorber on the line 7—7 of Fig. 8, and Fig. 8 is a longitudinal view on the line 8—8 of Fig. 7.

Referring to the drawings, Figs. 1-5, I have shown one modification of apparatus embodying features of my invention, comprising a generator 10, which is connected through the rectifier 11 to the condenser 12. The condenser 12 discharges into an evaporator 13, which is located within and in open communication with the absorber 14, the absorber 14 being also connected to the generator 10 through the heat exchanger 15, to provide a closed system.

More specifically, the apparatus comprises a long cylindrical metal tube 16, which is divided into longitudinal half sections 17 and 18 by a vertically extending partition 19 which extends substantially throughout the length of the cylindrical tube. The vertical partition 19 terminates just short of the ends of the tube as shown at 20 and 21, to provide spaces 22 and 23 whereby the half sections are in communication. One end of the tube comprises the generator, which is formed by a transverse vertical partition 24 depending across both half sections of the tube to a point slightly below the normal liquid level therein. The other end of the tube is enlarged to form the absorber 14 which is also separated from the rest of the tube by a similar transverse partition 25, which depends across both sections 17 and 18 to a point slightly below the normal liquid level therein. Within the generator end, a partition 26 extends upwardly across one-half of the tube to a point just above the normal liquid level therein.

Referring to Fig. 2 the absorber 14 comprises the enlarged section of the cylindrical tube, the upper half of which is insulated as shown at 27. Within the absorber 14, the vertical partition 19 is cut away to support the tube 28, which tube has its upper surface concave to provide an evaporating surface 13. Baffles 30 are provided within the absorber and extend above and below the evaporating surface 13.

It will be noted that the evaporating surface 13 is located within and in open communication with the absorber 14. In actual operation, the evaporator absorbs heat while the absorber liberates heat, and consequently, in order to take advantage of the refrigeration produced on the evaporating surface 13, it is necessary to prevent the flow of heat from the absorber 14 to the evaporating surface 13, and, at the same time, to provide means for supplying from an exterior source to be refrigerated the latent heat of evaporation to the refrigerant evaporating on the surface 13. To this end, the tube 28 has all but its top surface insulated, as shown at 29, and for purposes of convenience, this insulating material is used to mount the tube 28 on the cut away partition 19.

In order to supply the latent heat of evaporation to the refrigerant evaporating on the surface 13, the tube 28 is made the condenser of a secondary refrigerating circuit, and it is connected, by the conduit 33, to an evaporator 32 located within the cabinet R to be cooled. The secondary circuit comprising the condenser 28, the evaporator and the conduit 33 has therein a quantity of volatile refrigerant.

Both the absorber and the condenser are water cooled, the water entering the system through the pipe 35, first passing through conduits 36 arranged in series within the absorber 14 and then passing through conduit 37 to the condenser jacket, and finally leaves the condenser as at 38.

In actual operation, the cylindrical metal tube is partially filled with a solution of ammonia in water, as indicated in Fig. 1. An inert gas, which may preferably be air or a mixture of hydrogen and nitrogen having substantially the same density as the refrigerant, fills the interior of the absorber. The whole generator end of the apparatus is heated, for instance, by the burner 40, which causes a violent boiling of the liquid at that end of the tube. The most violent boiling will occur where the strong liquor from the absorber enters the generator, or in other words, in the vicinity of the partition 26 and this violent boiling will lift the strong liquid over the partition 26. Consequently the liquid level will be highest at this point, and the liquor will circulate around the right hand end of the vertical partition 19, through the heat exchanger 15, into the absorber 14. The ammonia, driven off by the application of heat, will pass through the rectifier 11, where any of the absorbent material will be condensed, the gas passing on to the condenser 12 while the condensed liquor will drop back into the generator 10. In the condenser, the ammonia gas will be condensed, from where it will flow onto the evaporating surface 13 of the condenser tube 28. The interior of the absorber will be under substantially the same pressure as the rest of the apparatus due to the presence of the inert gas but the liquid refrigerant, collecting on the evaporating surface 13, will evaporate, due to the fall in its partial pressure which will be equal to the total pressure within the apparatus minus the partial pressure of the inert gas.

The heat required to evaporate the liquid ammonia cannot readily be taken from the absorber 14 due to the insulating material 29, and consequently, the evaporating ammonia will take its latent heat from the vapors within the condenser 28 of the secondary circuit above mentioned. The removal of the heat from the condenser 28 will cause the temperature to drop and consequently, the pressure within the secondary circuit drops. This will result in evaporation of the liquid refrigerant within the evaporator 32, to cool the cabinet R, and the vapors thereof, passing up through the conduit 33, will condense in contact with the cold upper surface of the condenser 28. The condensed vapors will return by gravity to the evaporator 32.

The refrigerant vapors from the evaporating surface 13 will diffuse into and mix with the inert gas atmosphere within the absorber 14. The inert gas, as before stated, is of the same density as the refrigerant, but the mixture thereof with the refrigerant vapors adjacent the evaporator surface 13 will be quite cold. On the other hand, the inert gas, or mixture thereof with refrigerant near the absorbing surface, will be quite warm. Consequently there will be a circulation downwardly towards the absorbing surface inside the baffles 30 and upwardly towards the evaporator 13 outside of said baffles. The refrigerant vapors will, therefore, mix with the inert gas atmosphere and the mixture thereof will flow downwardly to the absorbing surface where the refrigerant gas will be absorbed by the liquor within the absorber 14. This circulation will be further aided due to the fact that the sides of the metal absorber 14 will be relatively warm, tending to heat the inert gas and to increase its tendency to rise along the outer paths.

The circulation of the strong liquor through one-half of the tube to the generator, and back through the other half of the tube to the absorber, will be caused by the heating of the generator end, as heretofore stated. The intermediate section of the tube will constitute a heat exchanger between the relatively cool strong liquor passing from the absorber to the generator and the relatively hot weak liquor passing from the generator to the absorber.

In Figs. 6, 7 and 8, I have disclosed a modified form of apparatus embodying my invention. In this modification, a generator 10' discharges liberated refrigerant gas through a rectifier 11' into a condenser (not shown) from where the liquefied refrigerant flows into the evaporator 13'. The metal container 14' forms the absorber, and corresponds to the left hand end of the cylindrical tube 16 of Fig. 1. A conduit 17', corresponding to the half section 17 of Fig. 1, conducts strong liquor from the absorber 14' to the generator 10'. A conduit 18', corresponding to the half section 18 of Fig. 1, conducts weak liquor from the generator 10' to the absorber 14', and is connected within the absorber 14' to the plate 60, which in turn is connected to plate 61 through the connection 62. The plate 61 is slightly inclined and is provided at its highest point with a plurality of apertures in its upper surface, substantially as indicated at 63. The sides of the plate 62 extend slightly above the upper surface thereof to form a pan-like member as at 64.

The remaining elements of the apparatus shown in Figs. 6, 7 and 8 are similar to the corresponding elements shown in Figs. 1 to 5 and have been indicated by similar reference characters primed.

The operation of the modified form is substantially the same as the operation of the apparatus shown in Figs. 1 to 5. The difference is primarily in the circuit for the flow of liquor from the generator to the absorber and back to the generator. For example, weak liquor flows through the conduit 18' from the generator 10' to the plate 60, thence through the plate 60, upwardly through the connection 62 and upwardly through the plate 61 where it comes in contact with, and is cooled by, the cooling water flowing through the conduit 36'. The weak liquid then flows through the apertures 63 and down along the top surface of the plate 61 to accumulate at the bottom of the absorber 14', as shown at 64. The strong liquor then returns to the generator 10' through the conduit 17'.

It should be understood that the condenser 28' is connected to an evaporator and that the condenser 28' is cooled by refrigerant evaporating on the evaporating surface 13' in substantially the same manner as in Figs. 1-5. Also that the circulation of the inert gas and refrigerant is exactly the same in this modified form as in Figs. 1-5.

It will be seen, therefore, that by providing means for preventing the transfer of heat from the absorber to the evaporator, which at the same time, providing means for supplying the latent heat of evaporation to the refrigerant evaporating within the evaporator, it is possible to locate the evaporator within the absorber.

While the form of embodiment of the invention as herein disclosed constitutes a preferred form, it is to be understood that other forms might be adopted, all coming within the scope of the claims which follow.

What is claimed is as follows:

1. In refrigerating apparatus, a generator, an absorber, a connection for strong liquor from said absorber to said generator, a connection for conducting weak liquor from said generator to said absorber, said last named connection including a plate-like member within said absorber, means for cooling said absorber including a conduit for cooling fluid within said plate-like member and means whereby the weak liquor after passing through said plate flows in heat exchange relation with said plate.

2. Refrigerating apparatus comprising a horizontally disposed absorber, a horizontally disposed evaporator located within said absorber, said evaporator comprising a conduit having an upper concave surface forming the evaporating surface, means for transferring heat from the interior of said conduit to the evaporating surface, and means for preventing the transfer of heat from the absorber to said evaporator.

3. Refrigerating apparatus comprising a long continuous member, slightly inclined from the horizontal, the higher end of said member being formed into a generator and the lower end of said member being formed into an absorber, a baffle within said member extending from said generator to said absorber, and separating said member into a plurality of longitudinally extending passages, one passage conducting weak liquor from the generator to the absorber, and the other passage conducting strong liquor from the absorber to the generator, means for heating the generator, means for cooling the absorber, a condenser connected to said generator, and an evaporator connected to said condenser and to said absorber.

4. Refrigerating apparatus comprising a long continuous member slightly inclined from the horizontal, the higher end of said member being formed into a generator, and the lower end of said member being formed into an absorber, a baffle within said member and extending from said generator to said absorber, said baffle separating said member into two longitudinally extending passages, one passage conducting weak liquor from the generator to the absorber, and the other passage conducting strong liquor from the absorber to the generator, means for heating the generator, means for cooling the absorber, a condenser connected to said generator, and an evaporator located within said absorber, said evaporator communicating with said condenser and said absorber, and means for preventing the transfer of heat from said absorber to said evaporator.

In testimony whereof I hereto affix my signature.

HARRY F. SMITH.